(12) United States Patent
Ito

(10) Patent No.: US 9,912,850 B2
(45) Date of Patent: Mar. 6, 2018

(54) VIBRATION TYPE ACTUATOR, OPTICAL DEVICE, AND IMAGE PICKUP APPARATUS

(71) Applicant: CANON KABUSHIKI KAISHA, Tokyo (JP)

(72) Inventor: Hiroki Ito, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 14/848,969

(22) Filed: Sep. 9, 2015

(65) Prior Publication Data

US 2016/0088227 A1 Mar. 24, 2016

(30) Foreign Application Priority Data

Sep. 19, 2014 (JP) ................. 2014-190648

(51) Int. Cl.
| | |
|---|---|
| *H04N 5/225* | (2006.01) |
| *H02N 2/00* | (2006.01) |
| *H02N 2/02* | (2006.01) |
| *G02B 7/08* | (2006.01) |

(52) U.S. Cl.
CPC ............ *H04N 5/2254* (2013.01); *G02B 7/08* (2013.01); *H02N 2/0015* (2013.01); *H02N 2/0055* (2013.01); *H02N 2/026* (2013.01)

(58) Field of Classification Search
CPC ........ H04N 5/2254; G02B 7/08; H02N 2/026; H02N 2/0055; H02N 2/0015
USPC ......................................................... 348/357
See application file for complete search history.

(56) References Cited

U.S. PATENT DOCUMENTS

| | | | | |
|---|---|---|---|---|
| 7,521,839 B2 * | 4/2009 | Mori | ...................... | G02B 27/08 310/323.02 |
| 2004/0189150 A1 | 9/2004 | Yamamoto et al. | | |
| 2006/0113867 A1 | 6/2006 | Sakatani et al. | | |
| 2011/0255185 A1 * | 10/2011 | Hashi | ...................... | G02B 7/08 359/824 |

FOREIGN PATENT DOCUMENTS

| | | | | | |
|---|---|---|---|---|---|
| JP | 11044899 | * | 7/1997 | ............... | G03B 5/00 |
| JP | 2001330573 | * | 10/2001 | ............... | H04N 2/00 |
| JP | 2004-304887 A | | 10/2004 | | |
| JP | 4652784 B2 | | 3/2011 | | |

* cited by examiner

*Primary Examiner* — Nhan T Tran
*Assistant Examiner* — Chan Nguyen
(74) *Attorney, Agent, or Firm* — Fitzpatrick, Cella, Harper & Scinto

(57) ABSTRACT

An ultrasonic motor includes a vibrator to which a piezoelectric element is fixed and a friction member having a frictional contact surface in contact with the vibrator. A pressurizing member pressurizes the vibrator toward the friction member using a resilient force of a coil spring. A pressurizing force setting unit transmits a driving force of a pressurizing force setting motor to a holding member and then sets the pressurizing force by altering an amount of deflection of the coil spring depending on the relative position of the holding member with respect to the pressurizing member. The friction member is driven relative to the vibrator by an elliptic vibration of the vibrator in a state where the projections provided on a vibration plate are brought into pressurized contact with the frictional contact surface of the friction member by the pressurizing force.

8 Claims, 6 Drawing Sheets

VIBRATION TYPE ACTUATOR, OPTICAL DEVICE, AND IMAGE PICKUP APPARATUS

BACKGROUND OF THE INVENTION

Field of the Invention

The present invention relates to a vibration type actuator for generating a driving force by the vibration of a vibrator, and an optical device and an image pickup apparatus including the vibration type actuator.

Description of the Related Art

An ultrasonic motor has been conventionally used as a driving source for driving, for example, a camera lens, taking advantage of driving capability from low speed to high speed in a silent operation, and high torque output. In the ultrasonic motor disclosed in Japanese Patent No. 4652784, a vibrator is pressurized (or pressed) by a plate spring and an ultrasonic vibration is excited on the vibrator under the pressurized contact condition. An elliptic motion is generated on the vibrator at a portion in contact with a friction member, so that the vibrator is linearly driven. Since the plate spring includes an adjusting unit configured to adjust the amount of pressurizing (or pressing) force applied between the vibrator and the friction member, a pressurizing force can be adjusted upon assembling the ultrasonic motor. The drive efficiency of the vibrator can be improved by generating an appropriate friction force between the vibrator and the friction member.

In general, an optimum pressurizing force is set by the adjusting unit taking into account only the drive efficiency of the vibrator upon assembling the ultrasonic motor. In this case, a holding force generated by a friction force applied between the vibrator and the friction member may be insufficient if some impact is applied to a member to be driven or a change in attitude occurs thereon.

SUMMARY OF THE INVENTION

The present invention provides a vibration type actuator that is capable of performing control for altering a pressurizing force when the friction member is driven relative to the vibrator by the vibration generated by the vibrator in a state where the vibrator is brought into pressurized contact with the friction member by a pressurizing unit.

According to an aspect of the present invention, a vibration type actuator is provided that includes a vibrator; a friction member configured to relatively move in contact with the vibrator; a pressurizing unit configured to bring the vibrator into pressurized contact with the friction member by a pressurizing force; a setting unit configured to set the pressurizing force applied by the pressurizing unit; and a control unit configured to alter the pressurizing force set by the setting unit.

Further features of the present invention will become apparent from the following description of exemplary embodiments with reference to the attached drawings.

DESCRIPTION OF THE EMBODIMENTS

Hereinafter, a description will be given of a vibration type actuator according to an embodiment of the present invention with reference to the drawings. The vibration type actuator according to the present embodiment is applicable to an electronic apparatus which is required to be reduced in size and weight and to exhibit a wide range of drive speed. For example, the vibration type actuator is applicable to driving of a lens in a lens barrel of a camera in which a motor which is small in size and is high in output power is required. A drive device for an optical element such as a lens, a prism, or the like, an optical device such as a lens barrel, and an image pickup apparatus are included in the technical scope of the present invention. Hereinafter, a description will be given by taking an example of an ultrasonic motor in which a piezoelectric element is used as an electro-mechanical energy converting element.

Figure 1:
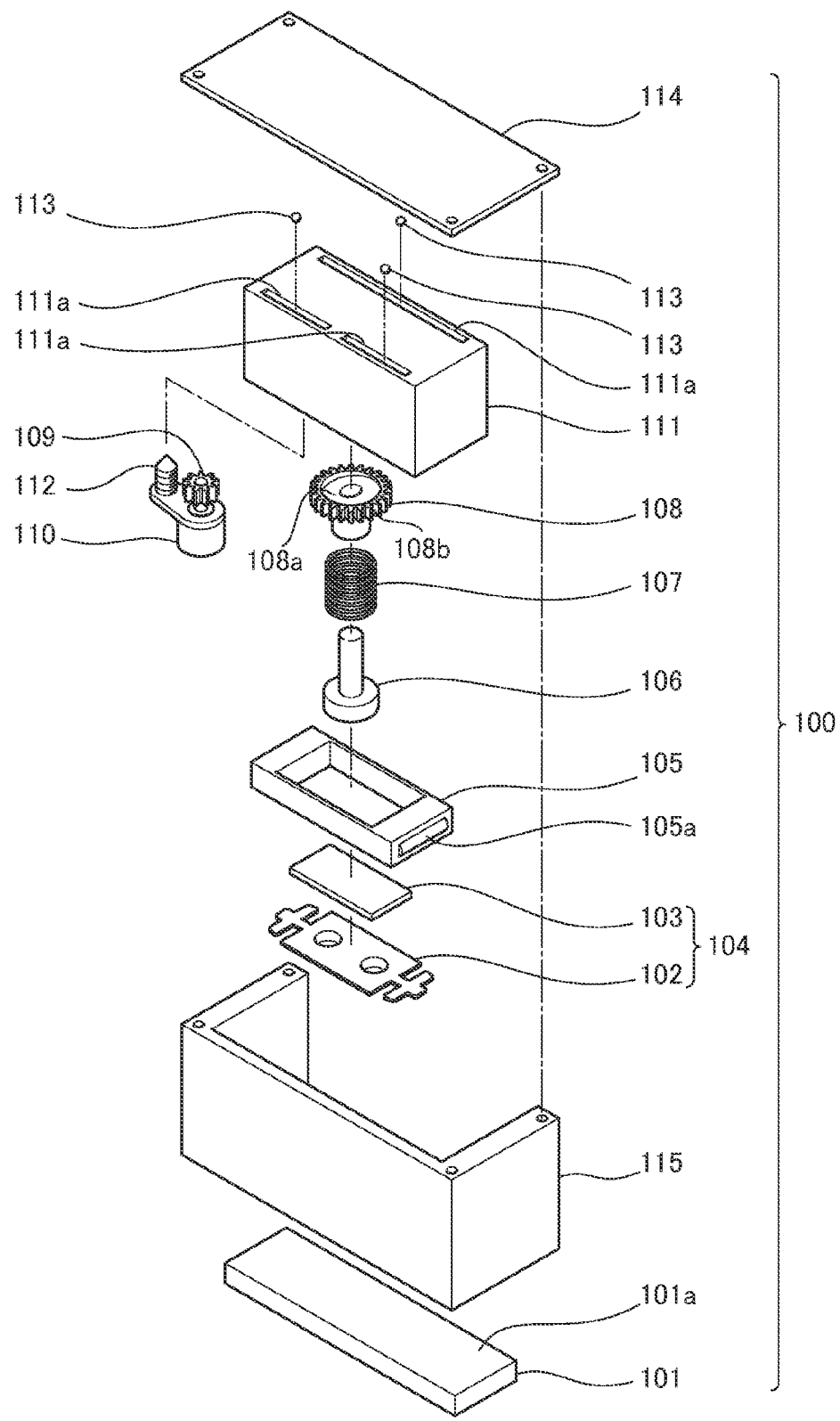
FIG. 1 is an exploded perspective view illustrating an ultrasonic motor according to an embodiment of the present invention.

FIG. 1 is an exploded perspective view illustrating an ultrasonic motor 100 according to one embodiment of the present invention. A friction member 101 serving as a member to be driven has a frictional contact surface 101a with which a vibrator 104 is brought into pressurized contact. A vibration plate 102 of the vibrator 104 includes contact portions (FIG. 2: a plurality of projections 102a) which are brought into contact with the frictional contact surface 101a of the friction member 101. A piezoelectric element 103 of the vibrator 104 is tightly adhered to the vibration plate 102 with an adhesive or the like. When a drive control unit applies a voltage to the piezoelectric element 103 in a state in which the piezoelectric element 103 is tightly adhered to the vibration plate 102, an ultrasonic vibration is generated, so that an elliptic motion is generated on the projections 102a of the vibration plate 102. A vibrator base 105 is a holding member for holding the vibrator 104. A pressurizing member 106 causes the vibrator 104 to be brought into pressurized contact with the friction member 101 by being urged against the same by a force of a coil spring 107. In the present embodiment, the pressurizing member 106 and the coil spring 107 serving as an urging member constitute a pressurizing unit. It should be noted that the present invention is not limited to the coil spring 107 serving as an elastic member but may also be an electromagnetic unit (an electromagnetic coil and a magnet) as long as it can pressurize the vibrator 104.

One end of the coil spring 107 is brought into abutment against a holding member 108 that receives a pressurizing reaction force caused by spring elasticity. The holding member 108 engages with a portion (protruded shaft portion) of the pressurizing member 106, and the coil spring 107 is elastically deformably supported by the holding member 108 and the pressurizing member 106. A gear member 109 engages with the gear section 108b provided on the outer periphery of the holding member 108. The gear member 109 serving as a transmission member is integrally assembled with a pressurizing force setting motor 110 so as to rotate together with a motor shaft. The pressurizing force setting motor 110 serving as a driving source is fastened and fixed to a base member 111 with a screw member 112. In the present embodiment, the holding member 108, the gear member 109, and the pressurizing force setting motor 110 constitute a pressurizing force setting unit 131. The base member 111 is brought into abutment against a plurality of rolling members 113 inserted into a guide groove 111a, and is guided along a guide groove (not shown) provided on a cover member 114 on the opposite side of the guide groove 111a. Each of the plurality of rolling members 113 is a spherical movable support member. The cover member 114 is fixed to a fixing member 115, and the friction member 101 is also fixed to the fixing member 115.

The base member 111 engages with the vibrator base 105 at a predetermined portion (joint portion) 105a in the relative movement direction. When the ultrasonic vibration of the piezoelectric element 103 is generated, the vibrator 104 relatively moves along the longitudinal direction of the friction member 101 by an elliptic vibration. In association with this, the vibrator base 105 in which the vibrator 104 is adhesively fastened moves, so that the base member 111 engaged with the vibrator base 105 is driven. Hereinafter, the direction along which the vibrator 104 moves relative to the friction member 101 is defined as a driving direction.

Figure 2:
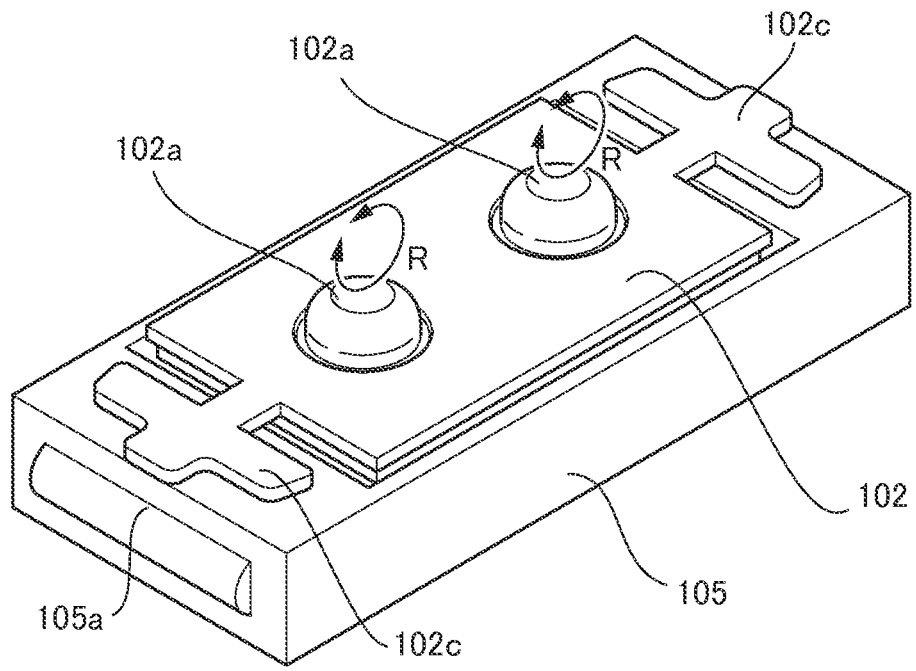
FIG. 2 is an enlarged perspective view illustrating a bonding state of a vibrator and a vibrator base according to an embodiment of the present invention.
Figure 3:
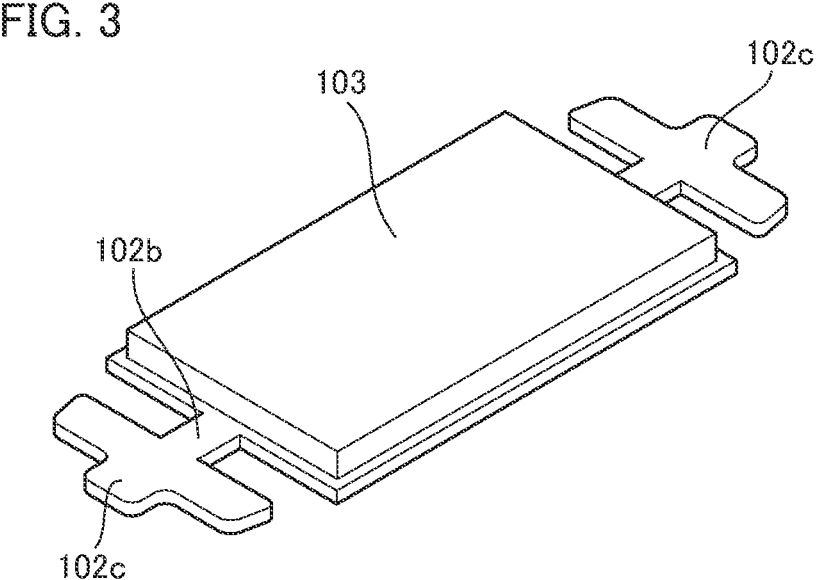
FIG. 3 is an enlarged perspective view illustrating a bonding state of a vibration plate and a piezoelectric element according to an embodiment of the present invention.

Next, a detailed description will be given of a configuration of the ultrasonic motor 100. FIG. 2 is an enlarged perspective view illustrating a bonding state of the vibration plate 102 and the vibrator base 105 shown in FIG. 1 as viewed from the friction member 101 side. FIG. 3 is an enlarged perspective view illustrating a bonding state of the vibration plate 102 and the piezoelectric element 103.

The vibration plate 102 and the vibrator base 105 are joined together by a cruciform portion (joint portion) 102c through bonding or welding. Two projections 102a (see FIG. 2) arrayed in the relative movement direction are formed on the central portion of the vibration plate 102. On the other hand, the piezoelectric element 103 is tightly adhered to the back surface 102b of the vibration plate 102 shown in FIG. 3 with an adhesive or the like. It should be noted that the method of tightly adhering the piezoelectric element 103 to the vibration plate 102 is not limited as long as the two components are tightly adhered to each other.

The piezoelectric element 103 has a laminated and integrated structure of a plurality of piezoelectric element films. An application of an alternate-current (AC) voltage to the piezoelectric element 103 by the drive control unit causes a vibration, thus exciting two vibration modes on the vibration plate 102 having the piezoelectric element 103 tightly adhered thereto. At this time, by setting vibration phases of the two vibration modes to obtain a desired phase difference, an elliptic motion is generated as indicated by arrows R illustrated in FIG. 2. When the elliptic motion is generated on the vibrator 104, the elliptic motion is transferred to the frictional contact surface 101a of the friction member 101. Thus, the vibrator 104 can be moved relative to the friction member 101. Details on the above-mentioned laminated structure of the piezoelectric element 103 and the above-mentioned vibration mode are disclosed in Japanese Patent Laid-Open No. 2004-304887, and explanation thereof will be omitted.

Figure 4:
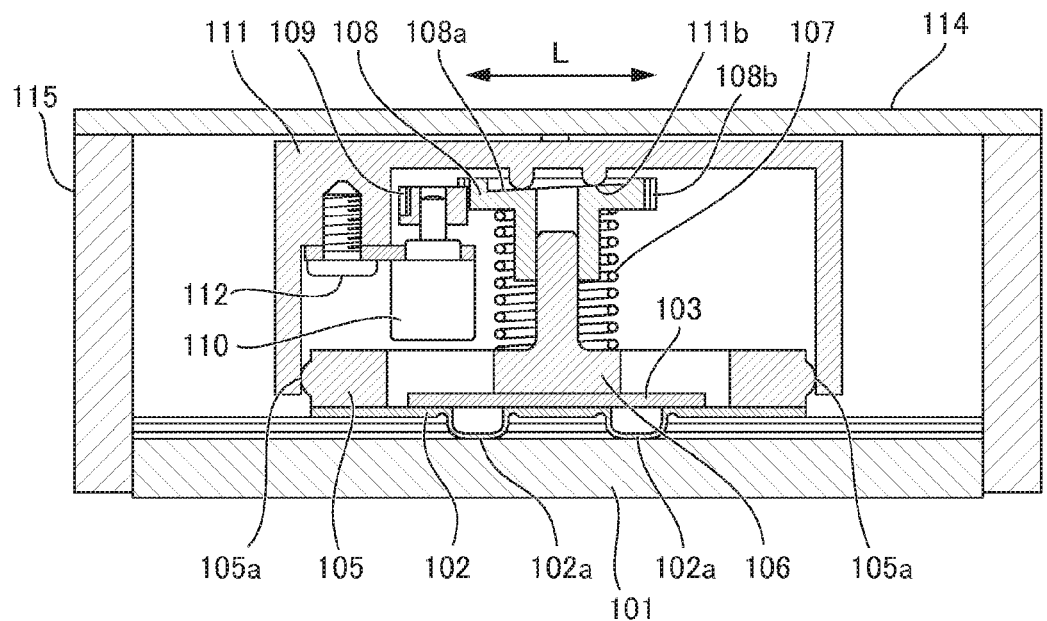
FIG. 4 is a cross-sectional view illustrating an ultrasonic motor according to an embodiment of the present invention.

FIG. 4 is a cross-sectional view illustrating the ultrasonic motor 100, and shows a cross-sectional structure of the ultrasonic motor 100 when viewed in cross-section passing through the central portion of two projections 102a provided on the vibrator 104.

The pressurizing member 106 is brought into abutment against the piezoelectric element 103 and is urged by the coil spring 107 in the direction perpendicular to the friction member 101 and the vibrator 104. The vibrator 104 receives a pressurizing force from the pressurizing member 106 and is brought into contact with the frictional contact surface 101a of the friction member 101. An elliptic motion of two projections 102a leads to movement of the vibration plate 102 relative to the friction member 101 in the direction (the direction perpendicular to the pressurizing direction) indicated by the arrow L illustrated in FIG. 4.

On the other hand, the vibrator base 105 fixed to the vibration plate 102 moves while following the vibration plate 102. The vibrator base 105 is brought into abutment against the base member 111 at two joint portions 105a, and the base member 111 relatively moves while following the vibrator base 105. In the present embodiment, an appropriate clearance is provided such that an ultrasonic vibration of the vibrator 104 is not inhibited by the vibrator base 105 and the base member 111. It should be noted that the method of bringing the base member 111 into abutment against two joint portions 105a is not limited to engagement. Since what is necessary is that the vibrator base 105 is brought into abutment against the base member 111 so as to be substantially integrally drivable, for example, both members may be urged by a spring member in the relative movement direction so as to cancel the hysteresis upon inversion driving.

A driving force is imparted from the vibrator base 105 to the base member 111 in the relative movement direction, and the base member 111 receives a reaction force for the pressurizing force from the coil spring 107 via the holding member 108. The pressurizing member 106 is supported by the holding member 108 in a state where the pressurizing member 106 is movable only in the direction substantially perpendicular to the frictional contact surface 101a of the friction member 101. The holding member 108 is brought into contact with a plurality of projections 111b provided on the base member 111 at a spiral oblique portion 108a. The holding member 108 rotates by means of the pressurizing force setting unit, i.e., the pressurizing force setting motor 110 and the gear member 109 via the gear section 108b provided on the outer peripheral portion of the holding member 108. A plurality of projections 111b provided on the base member 111 is brought into contact with the spiral oblique portion 108a of the holding member 108, and the holding member 108 vertically moves relative to the base member 111 in the direction perpendicular to the frictional contact surface 101a by the rotation of the holding member 108. An amount of deflection of the coil spring 107 is determined by the relative position (the height in the pressurizing direction) between the holding member 108 and the pressurizing member 106. In other words, a pressurizing force to be applied to the vibrator 104 can be freely set and altered by the vertical movement of the holding member 108.

Figure 5:
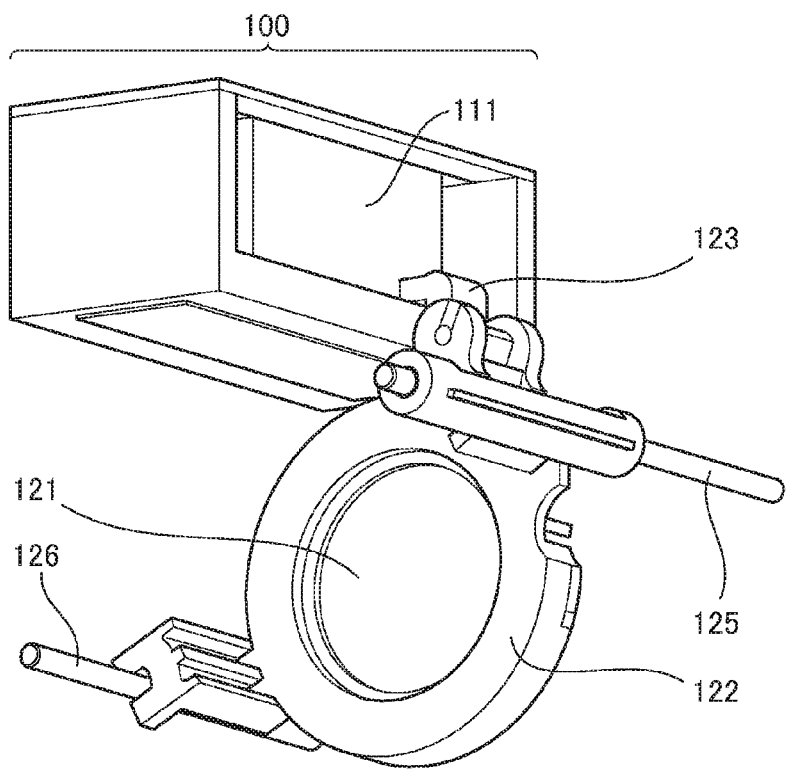
FIG. 5 is a perspective view illustrating a lens driving unit incorporating an ultrasonic motor according to an embodiment of the present invention.

Next, a description will be given of a case where the ultrasonic motor 100 is incorporated into the image pickup apparatus. FIG. 5 is a perspective view illustrating a lens driving unit when the ultrasonic motor 100 is incorporated into the image pickup apparatus. A focus position adjusting lens (focus lens) 121 is held and supported by a lens frame 122 so as to be movable in the optical axis direction. The lens frame 122 is guided by a pair of a first guide shaft 125 and a second guide shaft 126. A connecting member 123 connects the base member 111 with the lens frame 122, and the driving force of the connecting member 123 is transferred to the lens frame 122 when the ultrasonic motor 100 is driven. Consequently, the base member 111 and the lens frame 122 integrally move in the optical axis direction.

Figure 6:
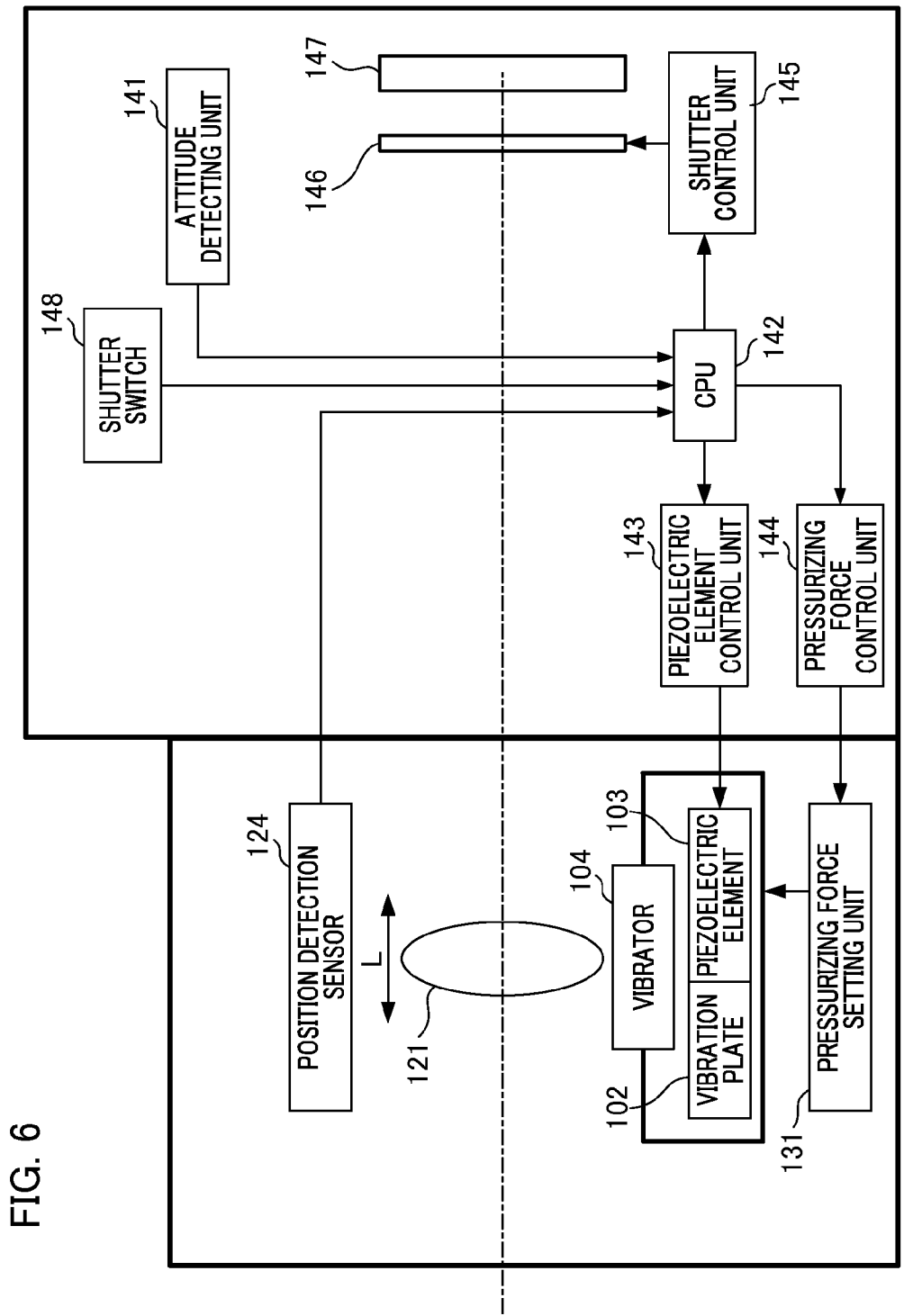
FIG. 6 is a block diagram illustrating an image pickup apparatus incorporating an ultrasonic motor according to an embodiment of the present invention.

FIG. 6 is a block diagram illustrating an exemplary configuration of an image pickup apparatus. The image pickup apparatus is constituted by a lens barrel and an apparatus body. For example, in the case of a camera system with interchangeable lens, the lens device can be mounted on the apparatus body but the lens section may be integrated with the apparatus body.

The image pickup apparatus includes an attitude detecting unit 141 with use of a gyro sensor or the like. Attitude information detected by the attitude detecting unit 141 is processed by a CPU (Central Processing Unit) 142. The CPU 142 gives a control command to each of a piezoelectric element control unit 143, a pressurizing force control unit 144, and a shutter control unit 145. The pressurizing force control unit 144 controls the pressurizing force setting unit 131 of the lens device or the lens section to set a pressurizing force to be applied to the vibrator 104. The piezoelectric element control unit 143 applies a voltage to the piezoelectric element 103 to drive the vibrator 104. When the ultrasonic motor 100 is driven, a focus position adjusting lens 121 moves in the optical axis direction indicated by the arrow L illustrated in FIG. 6. The lens frame 122 also includes a position detection sensor 124. Positional information detected by the position detection sensor 124 is input to the CPU 142, so that the piezoelectric element control unit 143 performs feedback control of the ultrasonic motor 100. The shutter control unit 145 outputs a control command to a shutter unit 146 to control an exposure time. An imaging unit 147 receives light imaged by an imaging optical system including the focus position adjusting lens 121 to photoelectrically convert it into an object image signal.

Figure 7:
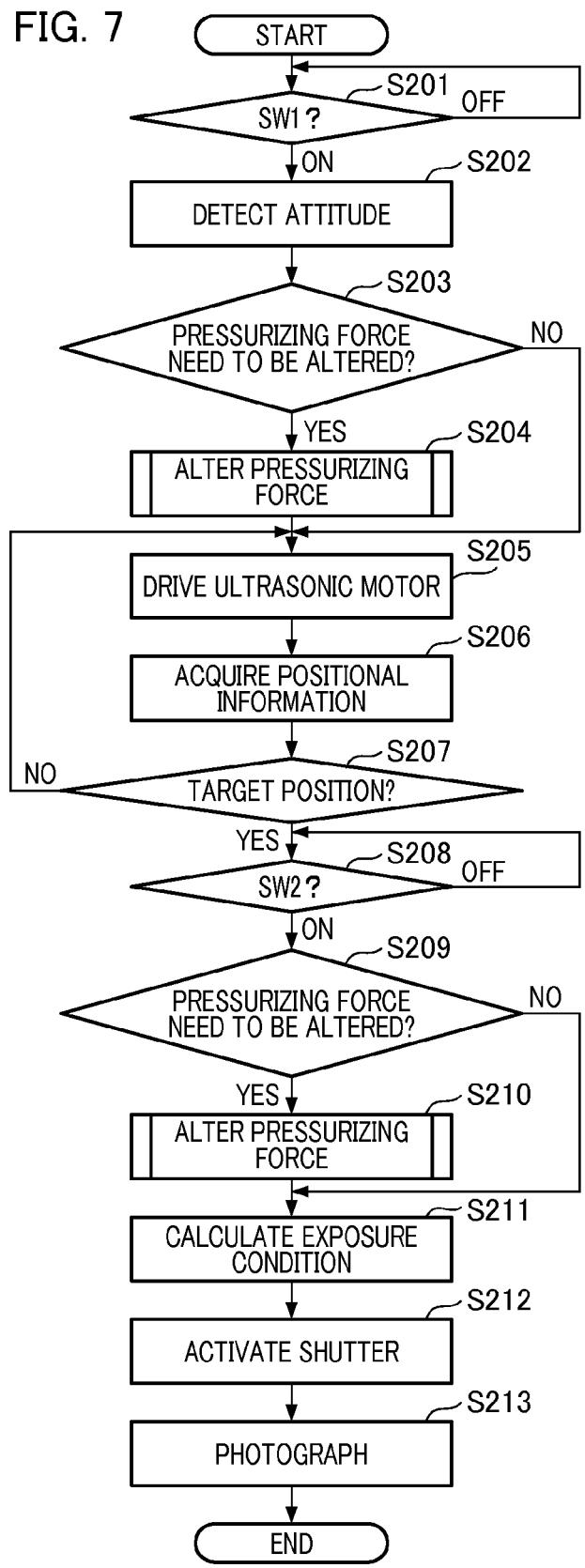
FIG. 7 is a flowchart illustrating an operation according to an embodiment of the present invention.

FIG. 7 is a flowchart illustrating an example of processing executed by the image pickup apparatus according to the present embodiment. The following processing is performed in accordance with a program read from a memory and executed by the CPU 142.

In a series of photographing operations, a user performs a half-press operation or the like of a shutter release button to start focus search in step S201. If it is determined that the first switch SW1 of the shutter switch 148 (FIG. 6) is turned ON, the processing proceeds to step S202, whereas if the first switch SW1 is turned OFF, the determination processing in step S201 is performed in repetition.

In step S202, the attitude detecting unit 141 detects the attitude of the image pickup apparatus and outputs an attitude detection signal to the CPU 142. In step S203, the CPU 142 determines the necessity for altering the pressurizing force. For example, when a photographing attitude of the image pickup apparatus is directed upward, the weight of the focus position adjusting lens 121, i.e., due to gravity, acts in the same direction as a friction force acting between the vibrator 104 and the friction member 101 of the ultrasonic motor 100. Thus, a force for holding the position of a lens such as the focus position adjusting lens 121 is weakened when some impact is applied to the image pickup apparatus. A propulsion force acting when the focus position adjusting lens 121 is driven may become insufficient. Thus, if the CPU 142 determines in step S203 that a pressurizing force needs to be altered, the processing proceeds to step S204, whereas if the CPU 142 determines in step S203 that no pressurizing force needs to be altered, the processing shifts to step S205. In step S204, the pressurizing force alteration processing is executed. The details of the processing will be described below with reference to the flowchart indicated as a subroutine in FIG. 8. In the present embodiment, a description will be given of a case where the pressurizing force alteration processing (an increase in pressurizing force) is executed when it is detected that the driving direction of the ultrasonic motor 100 is along the direction of gravity (a bi-directional match or within the range of difference in set angle). Of course, the CPU 142 determines the necessity of the pressurizing force alteration processing as appropriate depending on other detection results or the control state.

In step S205, the ultrasonic motor 100 is driven to start a focus search operation. The focus position adjusting lens 121 is driven in the optical axis direction. In step S206, the CPU 142 acquires positional information detected by the position detection sensor 124 point by point. In step S207, the CPU 142 determines whether or not the position of the focus position adjusting lens 121 reaches a target position. If the position of the focus position adjusting lens 121 reaches the target position, the focus search operation is ended and the processing proceeds to step S208, whereas if the position of the focus position adjusting lens 121 does not reach the target position, the processing returns to step S205.

In step S208, the CPU 142 determines whether or not a photographing operation start instruction has been made by turning ON the second switch SW2 of shutter switch 148 by the full-press operation of the shutter release button. If a photographing operation start instruction has been made, the processing proceeds to step S209, whereas if no photographing operation start instruction has been made, the determination processing in step S208 is performed in repetition. In step S209, the CPU 142 determines whether or not the amount of pressurizing force reaches a level required for maintaining the status of the focus position adjusting lens 121 against impact applied upon activation of the shutter unit 146. If the pressurizing force needs to be altered, the processing proceeds to step S210 and the CPU 142 calls and executes the subroutine for pressurizing force alteration as in step S204. In this manner, a sufficient pressurizing force for holding the focus position adjusting lens 121 is obtained. If no pressurizing force needs to be altered, the processing proceeds to step S211.

In step S211, the CPU 142 calculates an exposure condition. In step S212, the CPU 142 activates a shutter in accordance with a control command to the shutter unit 146, such as a shutter speed or the like, based on the exposure condition calculated in step S211. In step S213, a photographing operation is performed by using the imaging unit 147.

Figure 8:
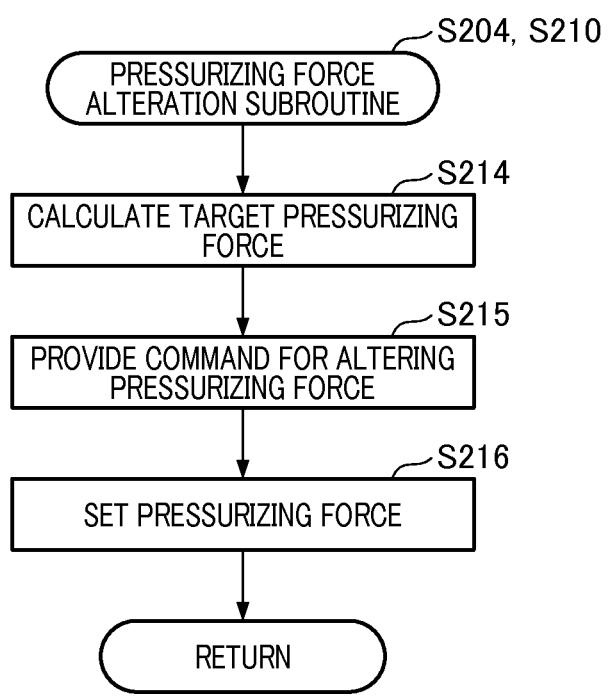
FIG. 8 is a flowchart illustrating pressurizing force alteration processing in steps S204 and S210 shown in FIG. 7.

Next, a description will be given of the pressurizing force alteration processing in steps S204 and S210 in FIG. 7 with reference to the flowchart shown in FIG. 8.

In step S214, the pressurizing force control unit 144 calculates an optimum pressurizing force based on the relationship between the attitude of the image pickup apparatus and a propulsion force and power consumption for driving a lens in accordance with the control command given from the CPU 142. For example, attitude detection information about the image pickup apparatus and information such as a propulsion force and power consumption for driving a lens are stored as predetermined reference table data in a memory, and are used by the CPU 142 as a reference for calculation. In step S215, the pressurizing force control unit 144 transmits a control command for altering a pressurizing force to the pressurizing force setting unit 131. In step S216, the pressurizing force setting unit 131 performs the pressurizing force setting processing based on the control command of the pressurizing force control unit 144, and the processing shifts to return processing.

In the present embodiment, a frictional holding force is appropriately controlled and is applied to a member to be driven depending on the control status such as during a drive or a stop of the member to be driven (member to be controlled) or a change in attitude of the image pickup apparatus, and at the same time, the drive efficiency optimization and low power consumption can be realized. According to the present embodiment, in an image pickup apparatus including a vibration type actuator with use of ultrasonic vibration generated on a vibrator, a sufficient frictional holding force can be applied to a member to be driven if some impact is applied thereto or a change in attitude occurs thereon.

In the above configuration, the pressurizing force alteration processing is executed after driving of the focus position adjusting lens but before activation of the shutter. According to the present embodiment, an image pickup apparatus including an ultrasonic motor, which can apply a sufficient frictional holding force to a member to be driven depending on some impact or a change in attitude, may be provided. While the present invention has been described with reference to exemplary embodiments, it is to be understood that the present invention is not limited to the disclosed exemplary embodiments but may be modified or changed in various ways within the range of the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-190648, filed on Sep. 19, 2014, which is hereby incorporated by reference herein in its entirety.

What is claimed is:

1. A vibration type actuator comprising:
   a vibrator;
   a friction member configured to relatively move in contact with the vibrator;
   a pressing unit configured to bring the vibrator into press contact with the friction member by a pressing force;
   a setting unit configured to set the pressing force applied by the pressing unit; and
   a control unit configured to alter the pressing force set by the setting unit,
   wherein the vibrator comprises a plurality of projections brought into contact with the friction member, and
   wherein the friction member moves relative to the vibrator by elliptic motion of the projections, which are brought into press contact with the friction member by the pressing force set by the setting unit.

2. The vibration type actuator according to claim 1, wherein the pressing unit further comprises a pressing member and an urging unit, and
   wherein the pressing member brings the vibrator into pressed contact with the friction member by a force applied by the urging unit.

3. The vibration type actuator according to claim 2, wherein the setting unit further comprises:
   a holding member configured to hold the pressing member and to receive a pressing reaction force by the pressing unit; and
   a driving source configured to drive the holding member,
   wherein the setting unit causes the driving source to alter the position of the holding member in a pressing direction so as to set the pressing force applied by the urging unit in accordance with a control command from the control unit.

4. The vibration type actuator according to claim 3, wherein the urging unit is an elastic member and the pressing force is set by altering an amount of deflection of the elastic member depending on the relative position of the holding member with respect to the pressing member.

5. An optical device for driving an optical element using a vibration type actuator, the vibration type actuator comprising:
   a vibrator;
   a friction member configured to relatively move in contact with the vibrator;
   a pressing unit configured to bring the vibrator into press contact with the friction member by a pressing force;
   a setting unit configured to set the pressing force applied by the pressing unit; and
   a control unit configured to alter the pressing force set by the setting unit,
   wherein the vibrator comprises a plurality of projections brought into contact with the friction member, and
   wherein the friction member moves relative to the vibrator by elliptic motion of the projections, which are brought into press contact with the friction member by the pressing force set by the setting unit.

6. An image pickup apparatus for driving an optical element using a vibration type actuator, the vibration type actuator comprising:
   a vibrator;
   a friction member configured to relatively move in contact with the vibrator;
   a pressing unit configured to bring the vibrator into press contact with the friction member by a pressing force;
   a setting unit configured to set the pressing force applied by the pressing unit; and
   a control unit configured to alter the pressing force set by the setting unit,
   wherein the vibrator comprises a plurality of projections brought into contact with the friction member, and
   wherein the friction member moves relative to the vibrator by elliptic motion of the projections, which are brought into press contact with the friction member by the pressing force set by the setting unit.

7. The image pickup apparatus according to claim 6, further comprising:
   a detecting unit configured to detect the attitude of the image pickup apparatus,
   wherein the control unit performs control for altering the pressing force applied by the pressing unit when the detecting unit detects that the driving direction of the vibration type actuator is along the direction of gravity.

8. The image pickup apparatus according to claim 6, further comprising:
   a focus position adjusting lens serving as the optical element;
   an imaging unit configured to image an object via the focus position adjusting lens; and
   a shutter unit configured to alter an exposure time,
   wherein the control unit performs control for altering the pressing force after driving of the focus position adjusting lens but before activation of the shutter unit.

\* \* \* \* \*